United States Patent [19]

Bradley et al.

[11] Patent Number: 5,548,635

[45] Date of Patent: Aug. 20, 1996

[54] SYSTEM FOR CONTROLLING EQUIPMENT WITHIN A TELEPHONE SUBSCRIBER'S PREMISES USING DTMF TELEPHONE TONES

[75] Inventors: Graham C. Bradley, Regina, Canada; Alton O. Stretton, Queretaro, Mexico

[73] Assignee: Sasktel, Canada

[21] Appl. No.: 184,833

[22] Filed: Jan. 21, 1994

[51] Int. Cl.⁶ .................................................. H04M 11/00
[52] U.S. Cl. .................................................. 379/102; 348/6
[58] Field of Search ........................ 379/37, 45, 102–105; 348/1, 3, 6

[56] References Cited

U.S. PATENT DOCUMENTS

| | | | |
|---|---|---|---|
| 33,369 | 10/1890 | Hashimoto | 379/104 |
| 3,532,822 | 10/1970 | O'Hanlon . | |
| 3,876,836 | 4/1975 | Langan . | |
| 4,006,316 | 2/1977 | Bolgiano | 379/105 |
| 4,100,375 | 7/1978 | Noller . | |
| 4,121,053 | 10/1978 | Dick | 379/104 |
| 4,130,732 | 12/1978 | Giovagnoni | 379/104 |
| 4,442,319 | 4/1984 | Treidl | 379/105 |
| 4,491,690 | 1/1985 | Daley | 379/102 |
| 4,540,851 | 9/1985 | Hashimoto . | |
| 4,596,900 | 6/1986 | Jackson | 379/105 |
| 4,611,098 | 9/1986 | Giorgio et al. | 379/105 |
| 4,625,080 | 11/1986 | Scott | 379/104 |
| 4,656,655 | 4/1987 | Hashimoto | 379/105 |
| 4,841,562 | 6/1989 | Lem | 379/104 |
| 4,878,236 | 10/1989 | Ray et al. | 379/45 |
| 4,878,245 | 10/1989 | Bradley et al. | 380/10 |
| 4,881,129 | 11/1989 | Mitsuhashi | 358/434 |
| 4,899,370 | 2/1990 | Kameo et al. | 379/104 |
| 4,931,780 | 6/1990 | LaMont et al. | 379/45 |
| 4,935,951 | 6/1990 | Robinson et al. | 379/45 |
| 4,974,255 | 11/1990 | Defay et al. | 379/106 |
| 4,993,058 | 2/1991 | McMinn et al. | 379/37 |
| 5,012,507 | 4/1991 | Leighton et al. | 379/37 |
| 5,109,407 | 4/1992 | Fujita et al. | 379/105 |
| 5,172,413 | 12/1992 | Bradley et al. | 380/20 |

FOREIGN PATENT DOCUMENTS

| | | |
|---|---|---|
| 1045733 | 1/1979 | Canada . |
| 1073134 | 8/1980 | Canada . |
| 1206637 | 6/1986 | Canada . |
| 1274328 | 9/1990 | Canada . |
| 2068611 | 11/1992 | Canada . |

*Primary Examiner*—Wing F. Chan
*Attorney, Agent, or Firm*—Hayes, Soloway, Hennessey, Grossman & Hage, P.C.

[57] ABSTRACT

A system for controlling telephone and non-telephone equipment located on the premises of a telephone subscriber is disclosed. The system includes at least one internal tone control device (ITCD), connected between a telephone outlet and the controlled equipment. The ITCD receives, decodes and validates a sequence of DTMF signals, converts it into a d.c. control signal and monitors the respective equipment with the d.c. control signal which remotely switches on/off the respective equipment. A plurality of different appliances can be operated in a "non-line of sight" mode over the telephone lines. A unique sequence of DTMF signals is associated with each ITCD. The sequence is selected such that the conventional telephone switching center is not activated by it, for avoiding interference between the system of the present invention and the conventional telephone communication. When the equipment is a TV appliance, the system may include a receiving-switching unit connected to the TV cable network and to an optical fiber TV cable, for switching the TV appliance between the two TV networks. In this case, the ITCD is connected to the telephone line and to the receiving-switching unit.

18 Claims, 4 Drawing Sheets

SYSTEM FOR CONTROLLING EQUIPMENT WITHIN A TELEPHONE SUBSCRIBER'S PREMISES USING DTMF TELEPHONE TONES

BACKGROUND OF THE INVENTION

1. Field of the Invention

This invention relates to a system for control of telephone and non-telephone equipment located on the premises of a telephone subscriber's residence or business, using standard telephone set apparatuses connected to a switched telephone network. More precisely, the system receives dual tone multi-frequency (DTMF) signals on the telephone lines, decodes and validates these signals and generates d.c. off/on control signals for activating or deactivating the subscriber's equipment connected to the system.

The DTMF signals may be generated locally, at the subscriber station, or from a remote location via the telephone wires that connect the subscriber's premises to the public switched telephone network.

2. Description of the Prior Art

Conventionally, in order to communicate a control command to an appliance, the user should personally actuate a desired command. The system of the present invention allows the user to control the appliances on his/her premises remotely, by use of a telephone which is connected to the switched telephone network.

As well, conventionally, for requesting a pay TV program, the user should establish telephone voice communication with the distribution center for ordering the program and for attending to various accounting matters. According to the present invention, the subscriber may control the delivery and selection of television delivered programming with ease. An example of a system for delivery and selection of TV programming by telephone is disclosed in U.S. Pat. No. 4,878,245 (Bradley et al.), where DTMF signals generate by the subscriber's telephone set are used to control equipment which is not located on the subscriber's premises.

The system of the present invention allows the user to control not only TV appliances, but also any type of telephone and non-telephone equipment. Thus, facsimile equipment at subscriber's premises may be operated through the telephone when the telephone line is busy (off-hook line) or idle (on-hook line), which is not taught by the prior art.

In contrast with the prior art, the system of the present invention incorporates means for reducing the interference between conventional telephone communication and the on-premises control functions.

SUMMARY OF THE INVENTION

It is an object of the present invention to provide a system for remotely activating and deactivating a plurality of different appliances located on a telephone subscriber's residential or business premises.

It is another object of this invention to provide a system for remotely controlling telephone and non-telephone equipment which system is inexpensive and simple to install.

It is still another object of this invention to provide a system for remotely controlling telephone and non-telephone equipment which allows a user to switch between two means of television programming delivery, namely between a conventional TV cable and a optical fiber TV cable.

It is still a further object of this invention to provide a system for remotely controlling telephone and non-telephone equipment having a minimal interference with the conventional telephone communication over the public switched telephone network.

Finally, it is an object of this invention to provide a means for wireless, non-line-of-sight remote control system for telephone and non-telephone equipment.

Accordingly, the present invention provides a system for controlling an appliance at a station which is connected to a telephone switched network using DTMF telephone signals, comprising: an internal tone control device for decoding a sequence of DTMF signals, verifying if said sequence of DTMF signals coincides with a preset identification code and converting said sequence into a d.c. control signal; means for connecting said internal control device to the telephone switched network for receiving said sequence of DTMF signals and transferring it to said internal control tone device; and means for transmitting said d.c. control signal from said ITCD to the appliance for monitoring said appliance.

According to another aspect of the present invention, there is provided a system for controlling a TV appliance at a station which is connected to a telephone switched network using DTMF telephone signals comprising: an internal tone control devices, for decoding a sequence of DTMF signals, verifying if said sequence of DTMF signals coincides with a preset identification code and converting said sequence into a d.c. control signal; a receiving-switching unit for receiving said d.c. control signal from said internal tone control device and coupling the TV appliance to the conventional TV cable network and to the optical fiber TV cable network according to said d.c. control signal; means for connecting said internal control device to the telephone switched network for receiving said sequence of DTMF signals and transferring it to said internal control tone device; and means for coupling said receiving-switching unit to the conventional TV cable network and to the optical fiber TV cable network for monitoring the TV appliance with said d.c. control signal.

According to still another aspect of this invention, there is provided an internal tone control device which comprises: an overvoltage protection and d.c. insulation unit for receiving a sequence of DTMF signals; a DTMF decoder connected to said overvoltage protection and insulation unit, for decoding a first and a second signal from said sequence of DTMF signals and generating a first and a second digit therefrom; a first digit detector having a first identification code, connected to said DTMF decoder for comparing said first identification code to said first digit and producing a first digit valid signal; a second digit detector having a second identification code, connected to said DTMF decoder for comparing said second identification code to said second digit and producing a second digit valid signal; a memory unit, connected to said first digit detector for storing said first digit; a logic unit connected to said second digit detector and to said memory unit, for determining if said sequence of said first and second digits is valid and generating a d.c. control signal; and a delay timer unit for resetting said memory if said second digit valid signal is not produced after a predetermined time.

The present invention is also concerned with a system wherein said receiving switching device comprises: a first connector for receiving an incoming TV cable and a second connector for receiving an output TV cable for the TV appliance; a third connector for connecting said internal control tone device; an optical receiver for connecting an optical fiber TV cable and for converting the optical signal received on said optical fiber cable into an electric TV signal; a relay including a relay switch connecting said optical receiver and said first connector to said second connector, and a relay coil for actuating said relay switch; and a transistor connected with the base to the third connector for receiving said d.c. control signal, the emitter connected to the ground and the collector connected through said relay coil to a d.c. positive power supply.

Advantageously, the system of the present invention provides a low-cost solution that permits a user to remotely activate and deactivate the television programming signal source or to switch between the program transmitted on a conventional coaxial cable and an optical fiber cable. Until a switching means is incorporated in commercially available television appliances and their associated remote controls there is a present demand to provide a subscriber with a low-cost means for remotely activating this switching.

Another advantage of the present invention is that when there are more users at the same subscriber's premises, any of them may use its telephone set to control one or more remotely located appliances.

Another advantage of this invention resides in that the telephone used to generate the DTMF control signals is inexpensive, and typically any premises is provided with a plurality of telephones. Therefore, it is not necessary to purchase a new signalling tone generator. Also, if the equipment to be controlled is close to a telephone outlet, a minimum of additional wiring is required to enable control of the equipment located on the premises.

Another advantage of this system is that it is easy to install, adjust and use. The system can be plugged in various existing standard telephone outlets. A simple adjustment should be made, namely an identification code is set by use of a plurality of two position switches incorporated in the system. The user adjusts the switches to tone dialling sequences not recognized by the telephone switching center to which the subscriber's telephone is connected. The subscriber's telephone company can advise the subscriber as to which dialling tone sequences will not activate the center. Examples of such sequences may be a two stroke sequence: "#" and "1", or "#" and "2", or "#" and "3". The subscriber can use three 3 different identification codes for his system. The keystroke sequences available varies from one telephone operating company to another and from one subscriber to another, depending on the special telephone features offered by the respective telephone company and on the specific features subscribed to.

Still another advantage of the present invention is that when the subscriber has a cordless telephone, this can be used to remotely control the equipment. The equipment to be controlled should not be in line-of-sight of the cordless telephone.

Yet another advantage is that the system may be used in future telephone network delivered services, whereas other conventional wireless control devices cannot generate or receive DTMF telephone signals. It is anticipated that the DTMF signals generated by the public switched telephone network will be used to control subscriber premises TV appliances to provide such future services as television screen delivered electronic mail.

In addition, the system includes means for minimizing the interference between conventional telephone communications and the control of the equipment with the present system.

BRIEF DESCRIPTION OF THE DRAWINGS

In the following, the invention will be described in detail with reference to the following drawings, wherein like reference numerals designate like parts.

DESCRIPTION OF THE PREFERRED EMBODIMENT

Figure 1:
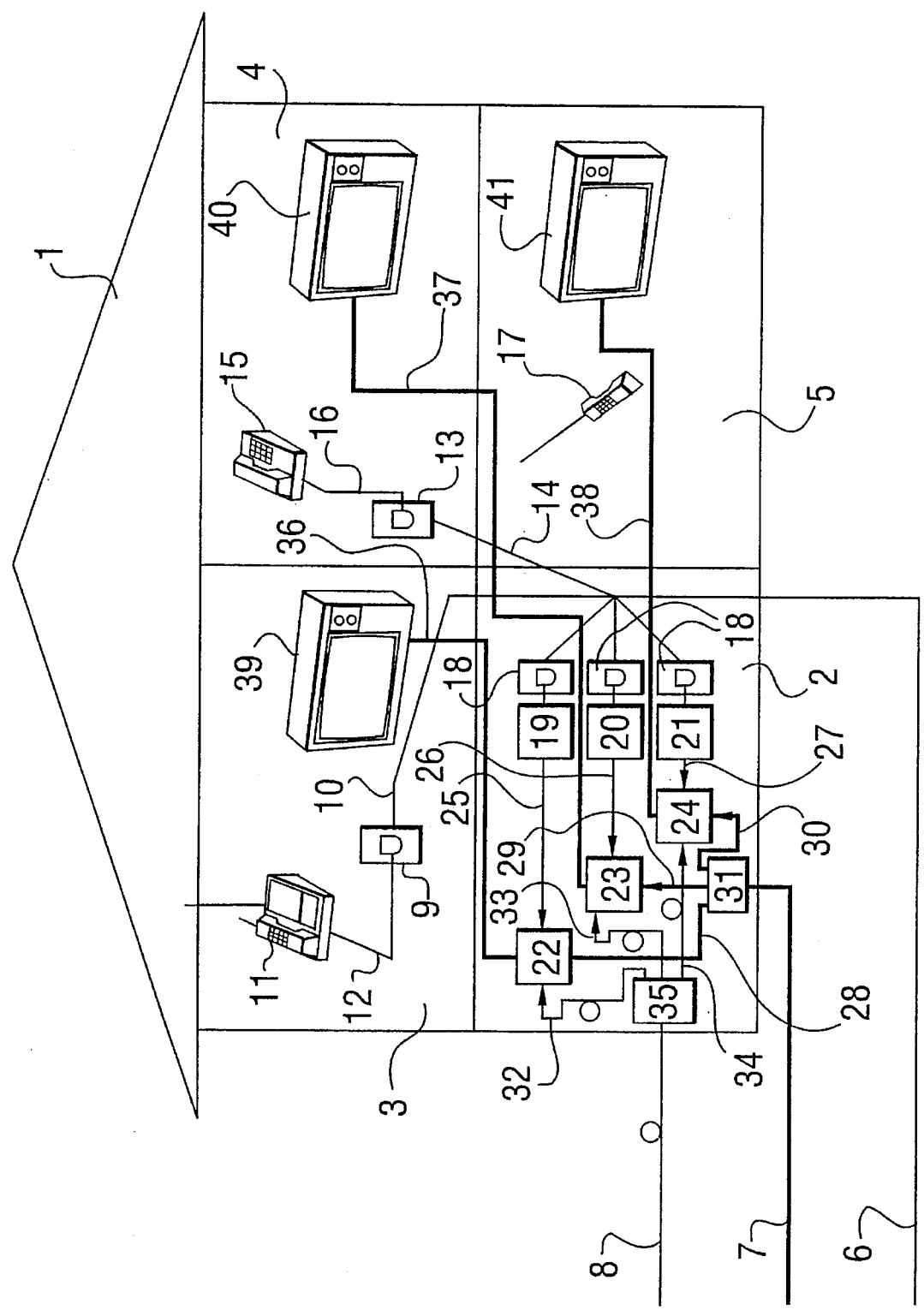
FIG. 1 illustrates a block diagram showing an example of a preferred embodiment of the system for controlling telephone and non-telephone equipment on the premises of a telephone subscriber of the present invention.

Referring now to FIG. 1 there is illustrated a block diagram showing an example of an embodiment of the system for controlling telephone and non-telephone equipment on the premises of a telephone subscriber according to the present invention. The premises shown in FIG. 1 is a house having four rooms 2, 3, 4, and 5. The house is connected to three different types of communication networks, wire pair connection to the public switched telephone network 6, a coaxial cable connection to a cable television system 7, and a fiber cable connection to an alternative television distribution system 8.

A plurality of telephone outlets and telephones are provided in house 1. Outlet 9 in room 3 is connected to the switched telephone network by telephone wire 10. A portable telephone base station 11 is plugged in outlet 9 via a telephone wire 12. The base station 11 is shown with the cordless telephone set apparatus resting in the base stations cradle. The cordless telephone is of the DTMF tone dialling type. A standard telephone 15 is connected to an outlet 13 in room 4 by a telephone wire 16. Outlet 13 is connected to the telephone network via cable 14. Telephone 15 also is of the DTMF tone dialling type. Room 5 does not have a telephone outlet. In order to place a telephone call, or transmit DTMF signals from Room 5 the cordless telephone handset 17 should be displaced from the base station cradle 11 in Room 3 into Room 5.

The telephone network connection wire 6 is connected to three additional telephone outlets 18 connected in parallel in Room 2. Plugged into each of these three outlets is an internal tone control device (ITCD) 19, 20 and 21, respectively. Each ITCD 19, 20 or 21 gives a low voltage d.c. control signal to an associated receiving-switching unit (RSU) 22, 23 or 24 via a low voltage control wire pair 25, 26 or 27 respectively.

The coaxial TV cable 7 supplies the subscriber's house 1 with the cable television distributed programming. The cable TV programming television signal is distributed on 3 separate coaxial cables 28, 29 and 30, using a standard cable TV splitter device 31. Coaxial cables 28, 29 and 30 are connected to receiving-switching units 22, 23 and 24, respectively.

The optical fiber cable 8 supplies house 1 with alternative television programming. A single optical fiber cable is represented in the embodiment of FIG. 1. Cable 8 is split into three optical fiber cables 32, 33 and 34, using a commercially available optical splitter device 35. Optical fiber cables 32, 33, and 34 are connected to receiving-switching units 22, 23 and 24, respectively.

Each of the receiving-switching unit has three inputs—a coaxial cable connector for receiving the cable television signal, an optical fiber cable connector for receiving alternative cable TV signal and a pair of wires carrying the low voltage d.c. control signal. Each receiving-switching unit 22, 23, 24 has a coaxial cable output 36, 37 and 38 respectively. The coaxial cable 36 supplies television signals to the TV receiver 39. Similarly, coaxial cables 37 and 38 supply television signals to television receivers 40 and 41 respectively.

ITCD apparatus 19 can be addressed using DTMF telephone signals dialled on telephones 15 and 17. ITCD 19 controls receiving-switching unit 22 such that the output television signal to television set 39 toggles between the cable television network signal and the optical fiber distributed alternative television signal. RSUs 22, 23 and 24 are provided with means for converting the optical fiber TV signal to conventional TV signals, compatible with standard cable television channel frequencies. The method of distributing television programming via an optical fiber distribution system is taught by U.S. Pat. No. 4,878,245 (Bradley et al.), and U.S. patent application Ser. No. 632,122 dated Dec. 20, 1990 (Bradley et al).

Similarly, receiving-switching units 23 and 24 can be addressed by dialling appropriate DTMF tone sequences.

The subscriber can use any of telephones 15 or 17 to generate the special DTMF tone sequences. However, the time of operation of these various telephone dialling means cannot overlap. As well, if a control operation is initiated during a telephone conversation, the DTMF control signals will disturb the telephone conversation as the signals will be heard over the telephone.

Therefore, the special tone sequences are chosen so as to minimize interference with the public switched telephone network. The DTMF signals are received and decoded by the ITCDs 19, 20 and 21. Each of devices 19, 20 and 21 is preset to recognize and respond to a different DTMF dialling tone sequence. A dialling tone sequence may be comprised of a sequence of two or three telephone keystrokes. Should ITCD 19 receive the keystroke sequence to which it is preset, it will transmit an appropriate d.c. control voltage signal to the associate receiving-switching unit 22. If the television set 39 receives the cable television network programming when the subscriber generates the DTMF dialling sequence, the d.c. control voltage causes device 22 to switch television set 39 from cable television programming to optical fiber distributed programming. Subsequent generation of the same DTMF tone sequence will switch television set 39 back to cable television network programming.

Figure 2:
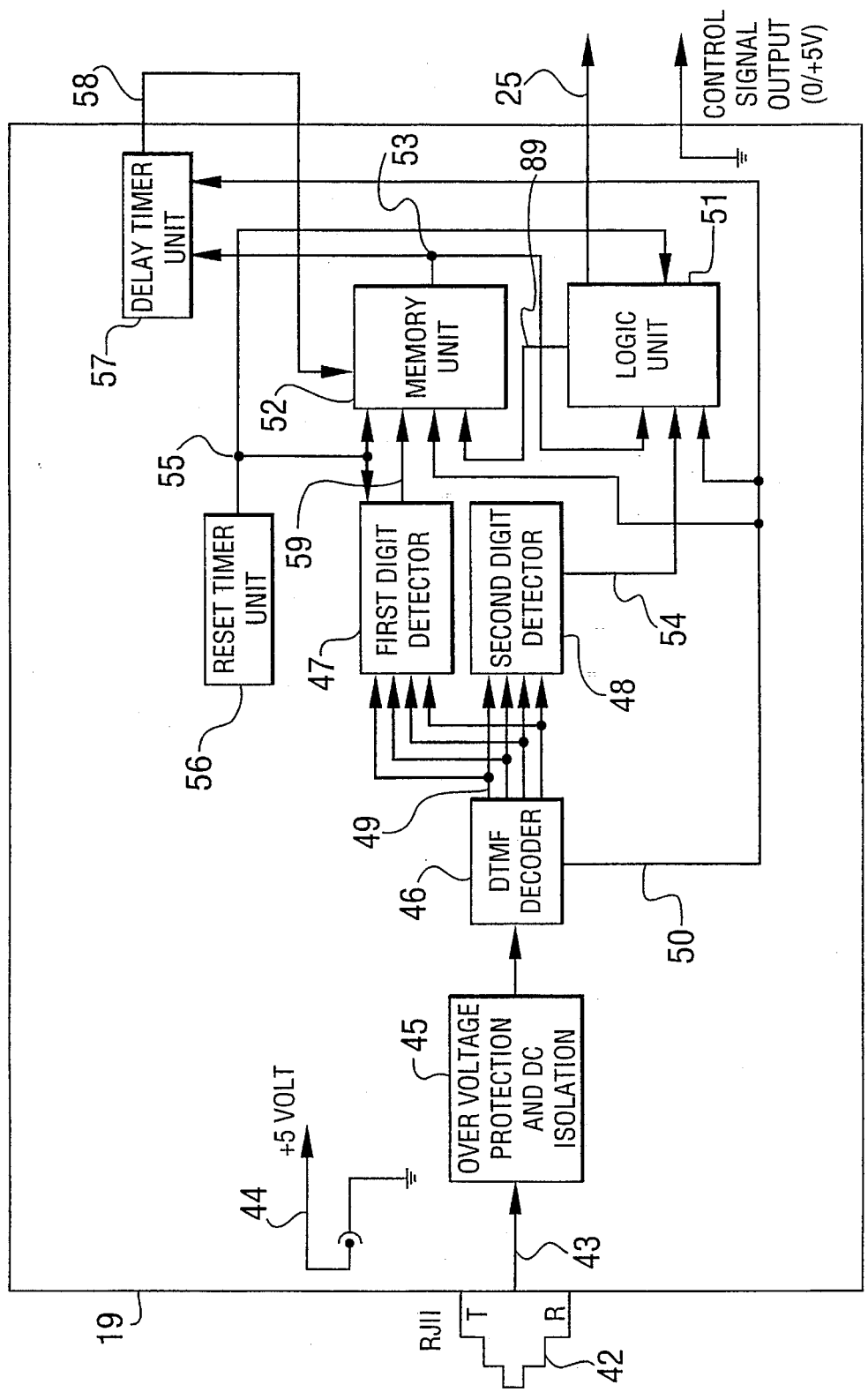
FIG. 2 shows a block diagram for an internal tone control device (ITCD) of the system shown in FIG. 1.

FIG. 2 shows a block diagram of the internal tone control device (ITCD) 19 of the system shown in FIG. 1. The device is assembled on a printed circuit board. The control signal 25 output by ITCD takes a value of 0 or +5 Volts d.c. Alternatively a LO/HIGH IMPEDANCE output means can be provided by using the control signal 25 to drive a relay or a transistor switch (not shown).

ITCD 19 is easy to install. Device 19 can be connected to the subscriber's telephone line by use of a RJ11 telephone jack 42 and a RJ 11 telephone receptacle outlet, shown as 18 in FIG. 1, which connects the tip and ring telephone wires 43 to ITCD 19.

ITCD 19 includes a low cost power supply means. Electrical power energizes the ITCD when the user connects a commercially available d.c. power adapter to a jack 44 located on the ITCD circuit board.

ITCD 19 is provided with an overvoltage protection and d.c. insulation unit 45 for protection against high voltages on the telephone lines. Unit 45 also includes capacitors for coupling the DTMF signals on the telephone line DTMF to a DTMF decoder 46. The capacitors provide d.c. insulation between the telephone lines and the ITCD.

DTMF decoder 46 receives the DTMF signals and produces a 4 bit binary code corresponding to the received and decoded signal. The binary code is transmitted to first and second digit detectors 47 and 48 via a data bus 49. The decoder 46 also produces a HIGH logic signal on a line 50 when the decoder 46 determines that a valid DTMF signal has been received.

ITCD 19 is preset to validate a sequence of DTMF signals that minimize interference with the public switched network telephone. If the identification code is selected to have a sequence of two DTMF tones, two detectors 47 and 48 are provided. Each detector has a switch array with switches set "on" or "off" according to a digit of the identification code. In the example of FIG. 2, the identification sequence includes two DTMF signals, so that the first detector has an identification code corresponding to a first digit, while the second detector, has an identification code corresponding to a second digit of the sequence. If a sequence of three DTMF signals is chosen, then the data bus signal is connected to a third detector (not shown in FIG. 2), similar to detectors 47 and 48.

First digit detector 47 gives a first digit valid signal 59, if the first keystroke is recognized by the detector. A memory 52 stores this first digit for a predetermined period, during which the second keystroke is received and the second digit is validated.

The control voltage on line 25 is generated by a logic unit 51. Output 25 commutes between 0 Volts and +5 Volts when logic unit 51 receives a logic HIGH signal on lines 53 and 54. A HIGH signal on line 53 indicates that a first valid DTMF signal has been stored in the memory unit 52. A HIGH signal on line 54 indicates that a valid second DTMF signal has been received and recognized by detector 48.

ITCD 19 also includes a delay timer unit 57 for preventing line 25 to go HIGH when an incorrect sequence of valid DTMF signals is received. The generation of an invalid sequence of signals is most likely to occur when the user operates telephones 15 and 17 shown in FIG. 1 to communicate over the public switched telephone network. If a second valid DTMF signal of the identification sequence is not received within 1.5 seconds after the reception of the first valid DTMF signal, the sequence is interpreted as not being generated for the control system operation, and is therefore invalid. In the embodiment illustrated in FIG. 2, the delay timer unit 57 resets the memory unit 52 via line 58, 1.5 seconds after receipt of a first valid DTMF code. The delay timer unit is provided to prevent DTMF signals transmitted during ordinary telephone operation from being interpreted as a control signal. Delay timer unit 57 also initializes memory 52 for the reception of the next sequence of control signals.

ITCD 19 includes a means for preventing a phone activation of devices controlled by the ITCD whenever electrical power supply is applied to the ITCD as e.g. after installation of the device, a power failure, etc. A reset timer unit 56 holds line 55 LOW for 0.5 seconds after the d.c. supply power 44 has been connected. This LOW signal on line 55 also resets the memory unit 52 to give a logic LOW on line 53, as in the case when the first digit valid signal was not received. In this way, reset timer unit 56 also initializes memory unit 52 for reception of the first digit valid signal, which results in that the output control voltage on line 25 is 0 Volts.

Alternately, a nonvolatile memory device could be used to maintain the voltage on the output line 25 after a power disruption. However, this is a more expensive solution.

Figure 3:
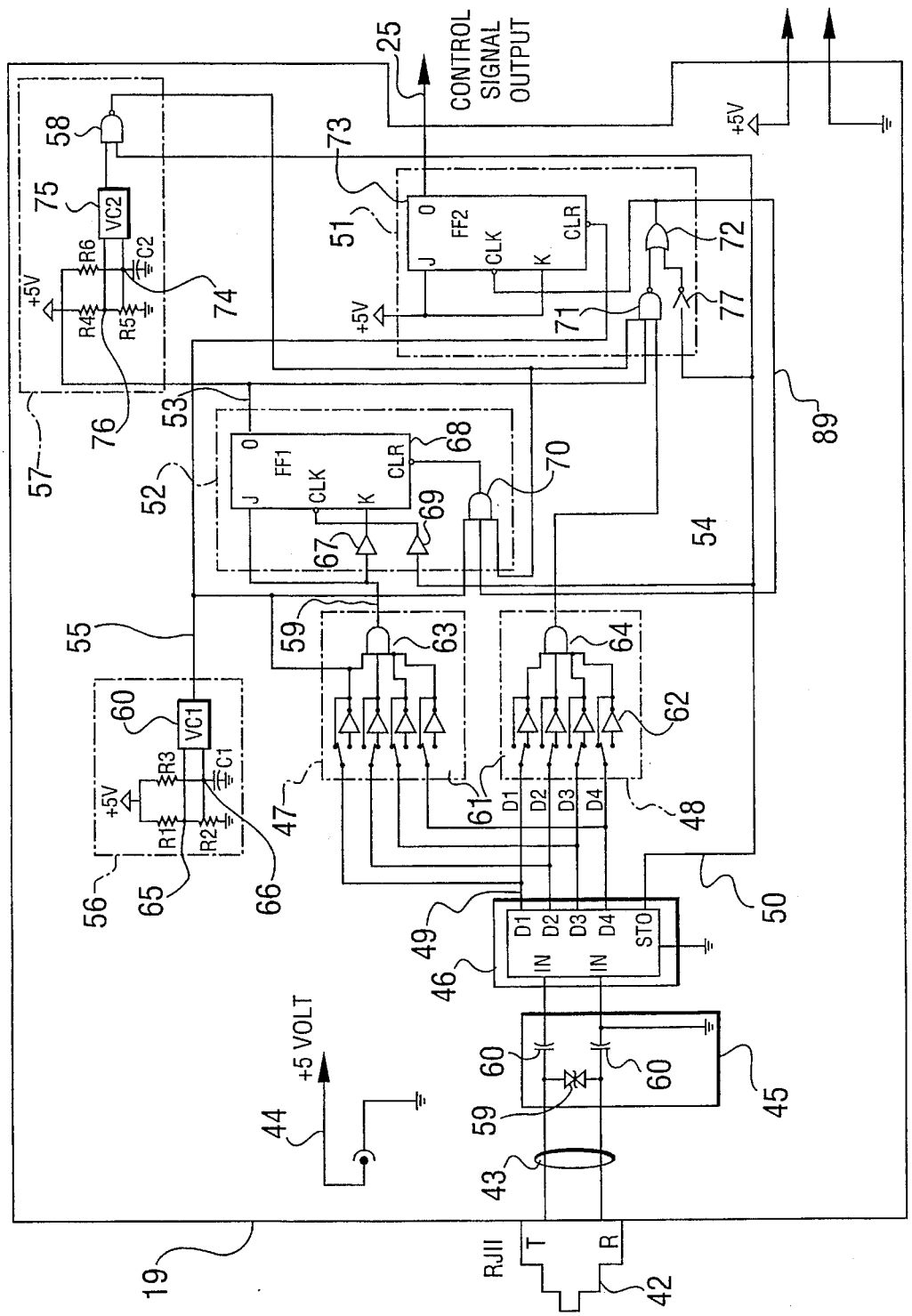
FIG. 3 illustrates a partial circuit diagram of the internal tone control device.

FIG. 3 illustrates a partial circuit diagram of internal tone control device (ITCD) 19, 20 or 21 according to a preferred embodiment of the present invention. Most power supply and ground connections are not shown in FIG. 3 for simplification purposes. The circuits shown in FIG. 3 use conventional logic gates of a low cost. Alternatively, specific integrated circuits (ASIC) may be used if one desires to obtain a more compact structure. The ITCD 19 is connected to the telephone network through telephone line connection plugs 18, 42, having tip and ring connection wiring 43. The device is supplied with power through power supply connection 44 and it generates control signal 25.

Overvoltage protection and insulation unit 45 comprises back-to-back zener diodes 59 for over-voltage protection, while capacitors 60, each connected in series with tip and ting wires 43 provide d.c. isolation.

The DTMF decoder 46 produces the 4 bit binary code corresponding to the decoded DTMF tones. The binary code is passed on to detectors 47 and 48 via data bus 49. Decoder 46 also produces a LOW to HIGH logic transition signal on line 50 when decoder 46 determines that a valid DTMF tone has been received.

The first and the second digit detectors 47 and 48 have a similar circuit diagram. Each comprises a SPDT switch array 61 and an AND gate 63, respectively 64. The user programs the desired identification code (i.e. the sequence of keystrokes recognized by the ITCD) by setting the switch array 61. First detector 47 shows, as an example, a logic circuit designed to decode the DTMF character "*". Detector 47 of the example shown in FIG. 3, requires that the first digit of the identification code be character "*". When decoder 46 receives a DTMF encoded "*" it outputs a HIGH level on outputs D1, D3 and D4 and a LOW level on D2. The switch and inverter circuits included in detector 47 invert the logic LOW from D2 to a logic HIGH. All switch/inverter circuits of detector 47 output a HIGH level signal to AND gate 63 only when the switches are so set and the DTMF "*" signal is being received. Then, AND gate 63 outputs a logic HIGH to memory 52 on line 59.

Similarly, the second detector 48 shows, as an example, a logic circuit designed to decode the DTMF character "1". Detector 48 shown in FIG. 3, requires that the second digit of the identification code be character "1". When decoder 46 receives a DTMF signal encoded "1", it outputs a LOW level on outputs D1, D2 and D3 and a HIGH level on D4. The switch and inverter circuits included in detector 48 invert the LOW outputs to logic HIGHs. All switch/inverter circuits of the second detector 48 output a HIGH level signal to AND gate 64 only when the switches are so set and the DTMF "1" signal is being received. When all four inputs to AND gate 64 are HIGH, a HIGH level logic signal is passed on to logic unit 51 on line 54.

Reset timer unit 56 is used to force the control signal output into the OFF state following power-up and to initialize logic unit 51 and memory unit 52. Upon the application of d.c. supply power, the supply voltage is divided by resistors R1 and R2 and a voltage 65 is established across R2. An integrating circuit R3, C1 is arranged in parallel with the resistive divisor R1, R2. Voltage 65 on resistor R2 and 66 on capacitor C1 are applied to the inputs of a voltage comparator (VC1) 60. Initially, the voltage 65 across the resistor R2 is greater than the voltage 66 across the capacitor C1 to keep the output 55 of timer 56 at logic LOW. Capacitor C1 starts charging and after 0.5 seconds the voltage across capacitor C1 exceeds that across resistor R2 so that the output voltage on line 55 switches to logic HIGH.

When AND gate 63 receives HIGH logic signals on all inputs from the switch/inverter circuits and the voltage on line 55 is HIGH, the gate 63 outputs a logic HIGH to memory unit 52.

Memory unit 52 includes a clocked flip-flop (FF1) 68 and an inverter 67 for applying opposite logic to the J and K inputs of the flip-flop 68. The LOW to HIGH transition on line 50, that indicates reception of a valid DTMF code, is inverted to a HIGH to LOW transition by an inverter 69. This transition causes the output of gate 63 to be stored in flip-flop 68.

For the above example, after a 0.5 second period, flip-flop 68 will store a HIGH logic upon reception of the "*" code. Flip-flop 68 is reset to a logic LOW when a DTMF code other than "*" is received, or a logic LOW is applied to flip-flop CLR input through a gate 70.

During the 0.5 second period following power-up, line 55 is maintained at logic LOW, which keeps gate 70 of memory unit 52 closed. This LOW input for gate 70 produces a logic LOW on the CLR input of the clocked JK flip-flop 68. The LOW level signal resets flip-flop 68, which in turn outputs a logic LOW on line 53 to logic unit 51.

Logic unit 51 comprises a JK flip-flop (FF2) 73, which is switched on the clock input, the J and K inputs being connected to the supply voltage. Flip-flop 73 is forced into the RESET state by a logic LOW signal on line 55 during the 0.5 second period after the power is applied to the device. Flip-flop 73 switches only when its clock output changes from HIGH to LOW logic. A LOW input from line 53 to NAND gate 71 causes the output of NAND gate 71 to go HIGH. This HIGH output is passed to an OR gate 72 and subsequently to the clock input of the flip-flop 73.

Upon the power-up, the output control signal 25 of flip-flop 73 goes LOW, namely it is 0V d.c.. Thus, all receiving-switching units 22, 23 and 24 controlled by output 25, as shown in FIG. 1, go to a preferred state. For the example shown in FIG. 1 this could result in the cable television network programming being transmitted to the television receiving apparatus 39, 40, and 41.

Delay timer unit 57 is provided to invalidate the sequence of DTMF signals if the valid digit signals do not follow each other at a preset interval. For the preferred embodiment of the present invention, it is assumed that if a second valid digit signal has been not received within 1.5 seconds after the reception of the first valid digit signal, the signals were not generated for the purpose of control system operation, and the sequence is therefore deemed invalid.

Delay timer unit 57 has a similar electric diagram reset as timer 56. It comprises a resistive divisor R4, R5 an integrator R6, C2, connected to inputs of a second voltage comparator (VC2) 75. When output line 53 is held LOW, the voltage 74 across capacitor C2 is lower than the voltage 76 across resistor R5. Thus, the output of comparator 75 will be LOW during the 1.5 second interval after line 53 goes HIGH. After 1.5 seconds, voltage 74 exceeds voltage 76 and the output of comparator 75 goes HIGH. NAND gate 58 receives the output of voltage comparator 75 and signal 50. The output of NAND gate 58 goes LOW when both the output of comparator 75 is HIGH and the valid DTMF signal on line 50 also goes HIGH. The result is that the output of AND gate 70 of memory unit 52 goes LOW and the flip-flop 68 is reset. This will discharge capacitor C2, voltage 74 will decrease and a LOW signal will appear on line 53 to gate 71 of logic unit 51.

The output of NAND gate 71 goes LOW only when: (1) a logic HIGH is stored in flip-flop 68 indicating the reception of a valid first digit DTMF code, (2) a logic HIGH is output form gate 64 indicating the reception of a valid second digit DTMF code, and (3) the 1.5 second period since the first digit valid signal has been stored in memory unit 51 has not elapsed and the output of NAND gate 58 is LOW.

If the output of gate 71 is LOW, the LOW to HIGH transition of the signal on line 50 (which indicates that a valid DTMF code has been received), inverted to a HIGH to LOW transition by inverter 77, appears on line 89 and thus on the CLOCK input of flip-flop 73 which will swap (if it was ON, will turn OFF, or if it was OFF, will turn ON).

The flip-flop 68 is reset by the same output of gate 72, namely when the second DTMF signal has been received. The LOW going signal on line 89 from OR gate 72 will effect the resetting of flip-flop 68.

Figure 4:
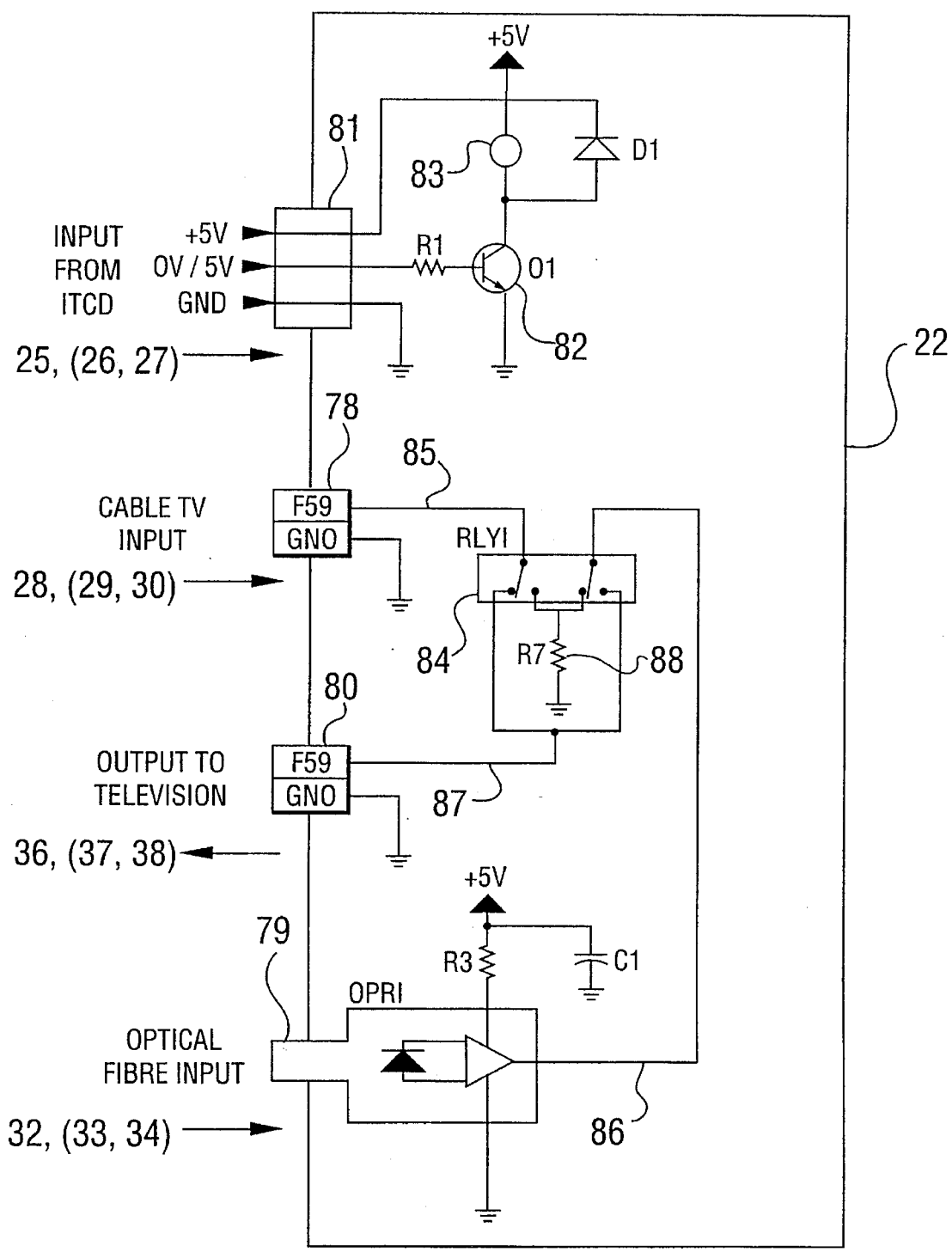
FIG. 4 shows a schematic diagram of a receiving-switching unit of the system shown in FIG. 1.

FIG. 4 is a schematic diagram for a receiving-switching unit 22 that permits switching between television programming delivered on a optical fiber cable means 32 and a coaxial cable means 28. Similar receiving-switching units are shown in FIG. 1 as 23 and 24. Units 22, 23, and 24 effect the connection between the standard DTMF dialling type telephone set apparatuses 11, 15 and 17, and the ITCDs 19, 20 and 21.

The coaxial television cable is preferably connected to RSUs 22 by a standard F59 coaxial cable connector 78 which is mounted on a printed circuit board (female, 75 Ohm).

The optical fiber television cable is preferably connected to RSU 22 via a female optical fiber receptacle. FIG. 4 shows the receptacle mounted integral with an optical receiver OPR1 on a printed circuit board 79. If a single mode optical fiber is used, the receptacle would be of the single mode type. If multimode optical fiber is used, the receptacle would be of the multimode type.

The television signal output from receiving-switching unit 22 is a signal compatible with standard television channel radio frequencies. This output is transmitted to a television receiver via a 75 Ohm coaxial cable. The coaxial output cable is connected to the coaxial cable connector 80. Connector 80 is a standard F59 type (female, 75 Ohm), which is mounted on a printed circuit board.

A jack 81 connects the low voltage output of ITCD 19 to receiving-switching unit 22. ITCD 19 supplies receiving-switching unit 22 with power supply and control signal voltages via a low voltage wiring. The circuit comprises a npn transistor 82 having a DPDT shielded RF switching relay 83 connected in the collector circuit.

The optical receiver device OPRI converts the optical signal to a corresponding electrical signal and amplifies this electrical signal. As the electrical signal that modulates the transmitting optical light source is comprised of TV compatible signals, the converted electrical signal will also be compatible with the TV receiver. The circuit board connects the converted and amplified signal to the contacts of relay 84 via line 86.

When the control voltage input from ITCD 19 is 0 Volts, transistor 82 is OFF and no current flows in the coil of relay 83. In this situation, the contacts 84 of relay 83 are open (see FIG. 4). The TV cable input is connected to the contacts 84 of relay via line 85, on the printed circuit board, and the TV signals received on TV cable are connected through contacts 84 to the TV set via line 87 and output connector 80. In this situation, the signal on line 86 is connected to ground through a 75 Ohm resistor 88.

When the control signal input from ITCD 19 is + 5 Volts, transistor 82 turns ON and current flows in the coil of the switching relay 83. The relay contactors are activated and the cable TV signals is switched to the 75 Ohm resistor R7. Relay 83/84 connects the signal on line 86 to the output connector 80 via line 87.

The embodiments of the invention for which an exclusive right or privilege is claimed are defined as follows:

1. A system for controlling a plurality of appliances at a station which is connected to a telephone switched network using DTMF telephone signals, wherein a number of appliances are TV appliances, said system comprising:

a like plurality of internal tone control devices, each for decoding a sequence of DTMF signals, verifying if said sequence of DTMF signals coincides with a preset identification code and converting said sequence into a control signal;

a like number of receiving-switching units each associated with a TV appliance and with an associated internal tone control device, for receiving said control signal from said associated internal tone control device and for selectively coupling the associated TV appliance to a conventional TV cable network and to an optical fiber TV cable network according to said control signal;

means for connecting each of said internal tone control devices to the telephone switched network for receiving said sequence of DTMF signals and transferring it to said internal tone control devices;

means for coupling each of said receiving-switching units to the conventional TV cable network and to the optical fiber TV cable network; and means for transmitting said control signal from said internal tone control device to the non-TV appliances for activating/deactivating the non-TV appliances with said control signal wherein said internal tone control devices comprise:

an overvoltage protection and d.c. insulation unit for receiving said sequence of DTMF signals;

a DTMF decoder connected to said overvoltage protection and insulation unit, for decoding a first and a second signal from said sequence of DTMF signals and generating a first and a second digit therefrom;

a first digit detector having a first identification code, connected to said DTMF decoder for comparing said first identification code to said first digit and producing a first digit valid signal;

a second digit decoder having a second identification code, connected to said DTMF decoder for comparing said second identification code to said second digit and producing a said second digit valid signal;

a memory unit, connected to said first digit detector for storing said first digit;

a logic unit connected to said second digit detector and to said memory unit, for determining if said sequence of said first and second digits is valid and generating said d.c. control signal; and a delay timer unit for resetting said memory if said second digit valid signal is not produced after a predetermined time.

2. A system as claimed in claim 1, wherein said means for coupling comprises:

a TV cable splitter for connecting the conventional TV cable network to each receiving-switching unit; and an optical fiber cable splitter for connecting the optical fiber TV cable network to each receiving-switching unit.

3. A system for controlling a TV appliance at a station which is connected to a telephone switched network using DTMF telephone signals comprising: P1 an internal tone control device, for decoding a sequence of DTMF signals, verifying if said sequence of DTMF signals coincides with a preset, identification code and converting said sequence into a control signal;

a receiving-switching unit for receiving said control signal from said internal tone control device and for selectively coupling the TV appliance to a conventional TV cable network and to an optical fiber TV cable network according to said control signal;

means for connecting said internal tone control device to the telephone switched network for receiving said sequence of DTMF signals and transferring it to said internal tone control device; and means for coupling said receiving-switching unit to the conventional TV cable network and to the optical fiber TV cable network wherein said internal tone control device comprises:

an overvoltage protection and d.c. insulation unit for receiving said sequence of DTMF signals;

a DTMF decoder connected to said overvoltage protection and insulation unit, for decoding a first and a second signal from said sequence of DTMF signals and generating a first and a second digit therefrom;

a first digit detector having a first identification code, connected to said DTMF decoder for comparing said first identification code to said first digit and producing a first digit valid signal;

a second digit detector having a second identification code, connected to said DTMF decoder for comparing said second identification code to said second digit and producing a said second digit valid signal;

a memory unit, connected to said first digit detector for storing said first digit;

a logic unit connected to said second digit detector and to said memory unit, for determining if said sequence of said first and second digits is valid and generating said control signal; and a delay timer unit for resetting said memory if said second digit valid signal is not produced after a predetermined time.

4. A system as claimed in claim 3, wherein said receiving switching device comprises:

a first connector for receiving an incoming TV cable;

a second connector for coupling said receiving switching device with the TV appliance;

a third connector for connecting said internal control tone device;

an optical receiver for connecting an optical fiber TV cable and for converting the optical signal received on said optical fibre cable into an electric TV signal;

a relay including a relay switch connected to connect said optical receiver and said first connector to said second connector, and a relay coil for actuating said relay switch; and a NPN transistor connected with the base to said third connector for receiving said control signal, the emitter connected to the ground and the collector connected through said relay coil to a d.c. positive power supply.

5. A system as claimed in claim 3, further comprising a reset timer unit for resetting said memory unit and said logic unit during a preset time delay after power is supplied to said internal tone control device.

6. A system as claimed in claim 5, wherein said time delay is 0.5 seconds.

7. A system as claimed in claim 3, wherein said predetermined time is 1.5 seconds.

8. A system as claimed in claim 3, wherein said delay timer unit resets said memory unit after each processing of a sequence of said first and second digits.

9. A system as claimed in claim 3, wherein said first digit detector comprises:

a first switch array for presetting said first identification code; and an AND circuit for producing said first digit valid signal when each bit of said first digit coincides with a corresponding bit of said first identification code.

10. A system as claimed in claim 9, wherein said second digit detector comprises:

a second switch array for presetting said second identification code; and an AND circuit for producing said second digit valid signal when each bit of said second digit coincides with a corresponding bit of said second identification code.

11. A system as claimed in claim 10, wherein each said first and said second switch arrays comprise a multitude of switch-inverter pairs for producing a direct and an inverted input according to said switch array configuration and applying it to said AND gate.

12. A system as claimed in claim 3, wherein said DTMF signal decoder detects if said sequence of DTMF signals appertains to the telephone switched network and accordingly generates a valid DTMF signal.

13. A system as claimed in claim 3, wherein said DTMF decoder generates said first and said second digits in a four bit format.

14. A system as claimed in claim 3, wherein said first digit memory comprises a first JK flip-flop for storing said first digit valid signal for said predetermined time.

15. A system as claimed in claim 3, wherein said delay timer unit comprises a first voltage comparator having a first input connected to a first resistive divider and a second input connected to a first integrator for generating a validating signal to said logic unit and said memory unit when the voltage on said second input exceeds the voltage on said first input.

16. A system as claimed in claim 3, wherein said logic unit comprises a second JK flip-flop and a NAND gate connected to the clock input of said second flip-flop for generating said control signal when said first digit valid signal and said second digit valid signal are present at the inputs of said NAND gate.

17. A system as claimed in claim 5, wherein said reset timer unit comprises a second voltage comparator having a first input connected to a second resistive divider and a second input connected to a second integrating circuit such that said memory unit and said logic unit are maintained in a reset state when the voltage on said second input exceeds the voltage on said first input.

18. A system as claimed in claim 3, wherein said overvoltage protection and d.c. insulation unit comprises two back to back zener diodes connected between the telephone lines and an insulating capacitor connected in series with each telephone line.

* * * * *

UNITED STATES PATENT AND TRADEMARK OFFICE
CERTIFICATE OF CORRECTION

PATENT NO.  : 5,548,635
DATED       : August 20, 1996
INVENTOR(S) : Graham C. Bradley and Alton O. Stretton It is certified that error appears in the above-indentified patent and that said Letters Patent is hereby corrected as shown below:

Claim 3, Column 11, Line 10, please delete "P1".

Signed and Sealed this

Twelfth Day of November, 1996

Attest:

BRUCE LEHMAN

*Attesting Officer*     *Commissioner of Patents and Trademarks*